Sept. 22, 1959  O. M. OLSON  2,905,231
RETRACTABLE SAFETY BELTS
Filed Aug. 27, 1956

INVENTOR.
ORBEN M. OLSON
BY
ATTORNEY

United States Patent Office 2,905,231
Patented Sept. 22, 1959

2,905,231

RETRACTABLE SAFETY BELTS

Orben M. Olson, Milwaukee, Wis.

Application August 27, 1956, Serial No. 606,366

7 Claims. (Cl. 155—189)

This invention relates to safety devices for use in vehicles such as automobiles or airplanes for preventing passengers from being thrown forward upon rapid deceleration of the vehicle. More particularly, this invention relates to retractable safety belts.

The injuries suffered by passengers in vehicle collisions are frequently due to the fact that the inertia of the passenger in the rapidly moving vehicle causes the passenger to be thrown forward suddenly when the vehicle is rapidly decelerated. Thus, in a collision, the driver, for example, of an automobile may be projected violently against the steering wheel and windshield of the car, and may be seriously or even fatally injured even though the car may in itself have more than sufficient structural strength to withstand the impact of the collision.

It has been proposed to prevent personal injury from this cause by providing safety belts or straps for the passengers, which are fastened to the frame of the vehicle and passed around the body of the passenger so as to restrain forward movement from the seat. Such devices have not met with favor because the loose ends of the belts are normally found disarranged on the seats or dangling toward the floor. The passengers sometimes sit down on the belts which then become entangled with their clothing and it is somewhat of a struggle for most passengers to find the two halves of the buckles and engage them to fasten themselves in place.

In accordance with the invention claimed, a new and improved retractable safety device is provided comprising a drum rotatably mounted on a base or supporting member. A strap is connected to the drum and is adapted to be wound thereon. Means are provided for normally yieldingly urging the drum in a rotating direction for winding the strap thereon. Interlocking means comprising a reciprocating movable first portion is mounted on the base or supporting member and a rotatably movable second portion is mounted on the drum. Upon actuation of the reciprocating movable first portion, such as upon closing of a door of an automobile, the first portion is actuated into engagement with the second portion to prevent rotation of the drum thereby locking the strap in a given extended position if the strap was unrolled while the door of the automobile was open. Means are usually provided for biasing the reciprocating first portion of the interlocking means out of engagement with the second portion of the interlocking means upon opening of the automobile door.

It is, therefore, one object of this invention to provide a new and improved safety device for vehicles.

Another object of this invention is to provide a new and improved safety belt which retracts the belts when not in use.

A further object of this invention is to provide a new and improved safety belt which locks the belt in a given extended position when a vehicle door is closed but retracts the belt if its buckle is unclasped when the vehicle door is open.

A still further object of this invention is to provide a new and improved dual purpose safety belt device which retracts the belt when a vehicle movable part is in a given position and which locks the belt in one of a plurality of positions when the movable part is in another given position.

A still further object of this invention is to provide a new and improved retractable safety belt device which may be operated manually, electrically or hydraulically by the operator of the vehicle.

Objects and advantages other than those set forth will be apparent from the following description when read in connection with the accompanying drawing, in which.

Figure 1:
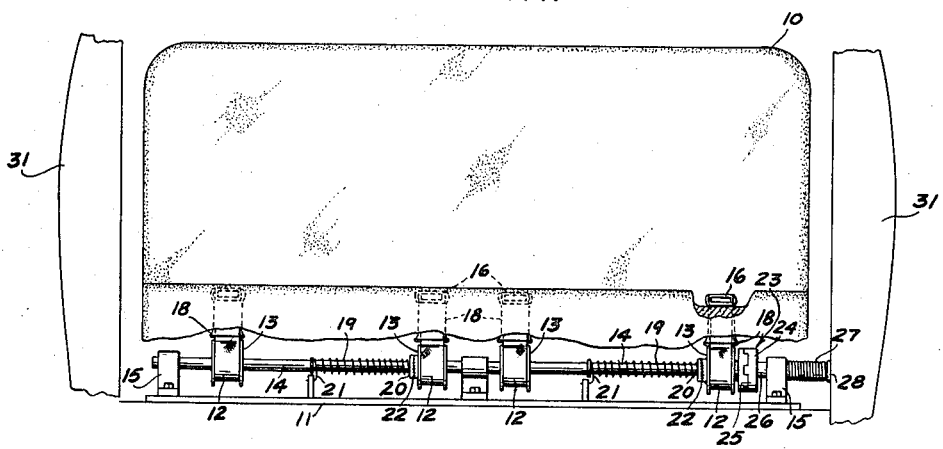
Fig 1 is a front elevational view partly in section of a vehicle seat embodying the invention and illustrating the safety belts in their retracted position.
Figure 2:
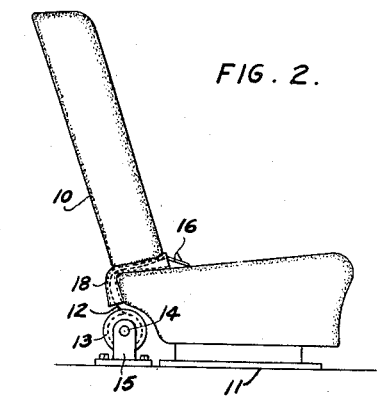
Fig. 2 is a side elevational view of the vehicle seat shown in Fig. 1.

Referring more particularly to the drawing by characters of reference, Fig. 1 illustrates a vehicle seat 10 mounted on a vehicle base or supporting member 11. The vehicle is provided at the two sides of each passenger reclining area with retractable safety belts 12 which are each housed in casings 13. Casings 13 are mounted on a shaft 14 which is rotatably mounted in suitable bearings 15 arranged on base or supporting means 11. In Fig. 1 safety belts 12 are shown in their normally retracted position within housing or casting 13. As shown in Fig. 2 when so retracted the buckles or clamps 16 on the ends of the belts remain projected from the housing so as to be visible and accessible.

Figure 3:
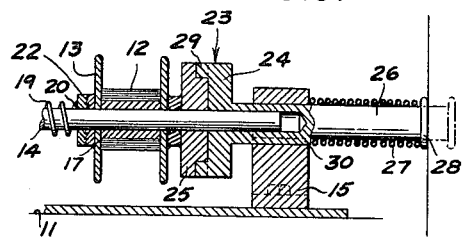
Fig. 3 is an enlarged view partly in section of the interlocking means illustrated in Fig. 1.

Safety belt 12 and its housing 13 are shown in more detail in Figs. 2 and 3 wherein belt 12 is depicted in its retracted position, being wound around a reel or drum 17. Housing 13 comprises a metallic or plastic guide 18 which extends from adjacent shaft 14 through or between the back rest and seat of the vehicle to the passenger reclining area in the manner shown in Fig. 2. Drum 17 which is mounted on shaft 14 for rotation therewith is normally yieldingly urged in a rotating direction for winding straps or belts 12 thereon by the action of a spiral spring 19. One spring is provided for each drum and is axially wound around shaft 14 with its outer end 20 attached to drum 17 and its inner end 21 attached to a bracket mounted on the floor of the vehicle. It will be seen from Fig. 3 that springs 19 can each be turned by a ratchet 22 to give the desired degree of tension to the springs.

When the safety belts 12 are extended and clamped around the body of a passenger, the action of the reels or drums 17 would normally tend to maintain a tension on belts 12. This tension though gentle might become uncomfortable to the passenger. To obviate any such discomfort and particularly to lock the safety belts 12 in given extended positions, an interlocking means 23 is provided. This interlocking means comprises a reciprocally mounted movable first portion 24 and a rotatably movable second portion 25 which engage each other to stop the rotating movement of shaft 14 and drum 17. As shown more clearly in Fig. 3, the reciprocally or axially movable portion 24 is mounted on one end of a shaft 26 which is coaxially aligned with and loosely surrounds at least a part of shaft 14. Shaft 26 is surrounded with a spirally wound compression spring 27 which abuts at one end thereof one side of bearing 15 and abuts at the other end thereof a collar 28 arranged on the other end of shaft 26. Thus, shaft 26 and the first portion 24 of the interlocking means 23 are normally biased away from the rotating movable portion 25 of the interlocking means, which latter portion is mounted on drum 17 or on shaft 14 adjacent drum 17 for rotation therewith.

Figure 4:
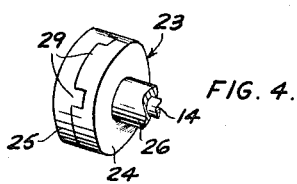
Fig. 4 is a perspective view of the engaging portions of the interlocking means illustrated in Fig. 3.

As shown in Fig. 4 the interlocking means may comprise a plurality of finger elements 29 which engage to form the solid or unyielding connection shown in Fig. 3. Bearing 15 shown in Fig. 3 is provided with an internal keyway 30 which is arranged for engagement with a mating key on shaft 26. Shaft 26 is therefore arranged for axial movement only. Upon the actuation of shaft 26 toward drum 17 portion 24 moves into engagement with portion 25 to firmly hold it and drum 17 from rotary movement. Shaft 26 may be actuated longitudinally toward drum 17 by the closing for example, of a door 31 of the vehicle. If the safety belts are firmly clamped around the waist of a passenger and the door 31 of the vehicle is closed, the pressure of the belt on the passenger is removed by the action of the interlocking means. Further, the safety belts are locked in their given extended positions against retraction or further extension. Until the door of the vehicle is opened, the belts remain in the positions in which they were at the time the door of the vehicle was closed. Upon opening of door 31, spring 27 biases shaft 26 and portion 24 of the interlocking means out of engagement with portion 25 to unlock the safety device. Belts 12 may then be readily unclasped. When the buckle elements 16 at the ends of belts 12 are disengaged, drums 17 automatically retract the belts into their casings 13. A pair of belts at each seat are generally preferable although, of course, a larger single belt may be used if desired with the free end hooking on an extension of the base or supporting member 11.

Figure 5:
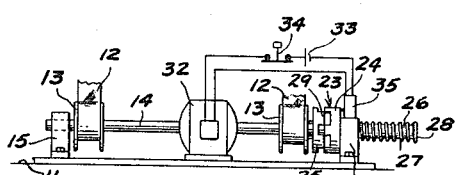
Fig. 5 illustrates a modification of the safety device shown in Figs. 1, 2 and 3, wherein an electric motor is used for causing retraction of the safety belt.

Fig. 5 illustrates a modification of the means for biasing or actuating shaft 14 and drum 17 in belt retracting direction. A suitable motor 32 may be mounted around shaft 14 and connected thereto for rotating shaft 14 in belt retracting direction. As shown, motor 32 is connected across a suitable battery 33 (which may be the car battery of an automobile) through an operator's switch 34 and a make and break contact switch 35. If the operator of the vehicle closes the switch 34 and the door 31 of the car is open, motor 32 will rotate shaft 14 until belts 12 have been completely retracted or until they have retracted to that extent necessary for tightening the belts around the waist of an operator. It is desirable to provide some form of motor slippage or disconnection means as soon as the motor has taken up the slack of belts 12 and the belts are fitted gently around the waist of the passenger. This form of motor slippage means is well known in the art and will not be discussed herein.

The make and breaker switch 35 is of the usual spring biased type which is closed under normal conditions and opened when actuated. When shaft 26 is actuated axially by the opening of a car door in the manner illustrated in Fig. 1 and the operator of the vehicle has closed switch 34, motor 32 is energized and retracts the safety belts either into their housing or until a predetermined resisting pressure occurs such as that offered by the waist of a passenger. At this point the motor is disconnected from shaft 14 or deenergized. Upon closing of the vehicle door the switch 35 is opened to deenergize the motor and the drums of the interlocking means are locked together to firmly hold the belts in a given extended position until release by the subsequent opening of the car door.

Figure 6:
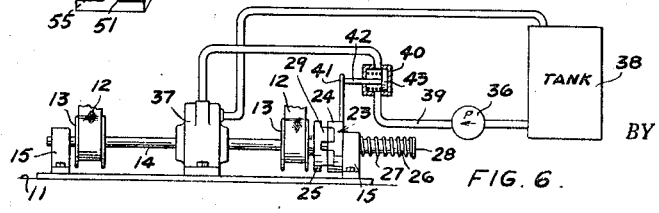
Fig. 6 illustrates a further modification of the safety device shown in Figs. 1 to 4, inclusive, wherein a hydraulic system is used for retraction of the safety belts.

Fig. 6 illustrates another means of biasing or actuating shaft 14 and drums 17 in belt retracting direction. A hydraulic means is provided for operation by a pump 36 of the vehicle motor. This hydraulic means may comprise, for example, a turbine 37 directly connected to the shaft 14. This turbine is actuated by fluid under pressure such as oil which is pumped from a reservoir 38 through a pipeline 39 by pump 36 to turbine 37. A valve 40 controls the flow of oil from reservoir 38 through pipeline 39 to turbine 37. Valve 40 is actuated to open position by a lever 41 mounted on the axially movable portion 24 of the interlocking means 23. When the vehicle door is opened, the spring biasing means 27 forces lever 41 into engagement with the pluger 42 of valve 40, thereby actuating valve element 43 to valve open position. Oil under pressure then flows through valve 40 and into and through turbine 37 in the usual manner for causing actuation thereof. The action of turbine 37 must be controlled in the same manner as motor 32 described above under Fig. 4.

Figure 7:
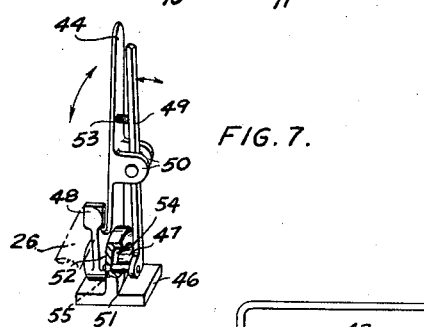
Fig. 7 illustrates a modification of the interlock actuating means shown in Figs. 1 to 5, inclusive.

Fig. 7 illustrates a modification of Figs. 1 to 5, inclusive, wherein the interlocking portions 24 and 25 are engaged to lock the belt straps in a given position by a hand actuated lever means 44. This lever means causes engagement or disengagement of the interlocking portions 24 and 25 depending on its position. Lever means 44 may be mounted adjacent one of the vehicle seats so that upon predetermined movement of this manually operated means shaft 26 of the safety belt device will be actuated longitudinally to cause engagement or disengagement of portions 24 and 25 of the interlocking means 23. Lever means 44 is provided with a hub 47 which is pivotally mounted on an ear 52 of a bracket 46. Bracket 46 is mounted on the base 11 of the vehicle. A lever arm 48 formed integral with hub 47 of lever means 44 is arranged for engagement with shaft 26 upon actuation of lever means 44 toward shaft 26. Lever means 44 further comprises a pair of ears 50 extending laterally of its length which form bearing surfaces for a locking lever 49 pivotally mounted thereon. Locking lever 49 has a lug 51 mounted at one end thereof to extend substantially perpendicularly thereto. Lug 51 is arranged to move within a slot 54 formed within the ear 52 of bracket 46. A spring 53 mounted between lever means 44 and locking lever 49 biases locking lever 49 and more particularly lug 51 into slot 54. At one end of slot 54 an aperture 55 is provided which extends through the ear 52 of bracket 46.

When lever means 44 is rotated counterclockwise (looking at Fig. 7 from the right end) to the position shown in Fig. 7 to lock portions 24 and 25 of the interlocking means 23 together, locking lever 49 is also actuated with lug 51 sliding along within slot 54. At that point in the rotation of lever means 44 and locking lever 49 where lug 51 passes over aperture 55, spring 53 biases lug 51 into aperture 55 to lock lever means 44, locking lever 49 and the portions 24 and 25 of the interlocking means 23 together. This position is shown in Fig. 7. To disengage the portions 24 and 25 of the interlocking device 23 the operator biases lever arm 49 toward lever means 44 to withdraw lug 51 from aperture 55 and then rotates means 44 and locking lever 49 clockwise (looking at Fig. 7 from the right end) to the interlock disengaging position.

Thus, the above disclosed invention features a retractable safety belt for either cars, airplanes or the like wherein the belt travels through metallic or plastic guides between the seat back and the base of the seat to a spring or motor driven roller. This roller takes up the belt or adjusts its length as needed. When the safety belts are not in use, the belts are rolled up beneath the seat and out of sight.

The locking device on the rotating roller or shaft is either hand operated or automatically operated by the closing of the door of the vehicle or any other movable part thereon. The actuation of the door of the vehicle, for example, or the hand lever, causes the engageable parts of the interlocking device to lock the reel or roller of the retractable safety device in a given position. If the belts are locked around the passenger of the vehicle the passenger is restrained from the inertia effects of quick stopping or accidental collisions and the resulting bodily damage occurring therewith. The belts remain out of sight when not in use. By pulling one belt the other belts pull out as desired because they are both connected to a common shaft the rotation of which either retracts the belts or extends them. In the motor driven modifications shown in Figs. 5 and 6, the motors drive the belts and their respective drums simultaneously in either direction thereby making extension or retraction of the belts automatically. As shown in Fig. 7, the interlocking means may be operated by the passengers or in the case of an airplane, the lock may be operated by the airplane personnel so that the belts arranged on each of the seats in the airplane which belts are mounted on a common shaft or actuated by a common shaft may be locked in place at one time by a single operating means.

While the foregoing description describes certain specified forms of the invention by way of example, it will be understood that they are merely for purposes of illustration to make clear the principle of the invention, which is not limited to the particular form shown but is acceptable to various modifications and adaptations in different insulations as will be apparent to those skilled in the art without departing from the scope of the invention as stated in the following claims.

What is claimed is:

1. A safety belt mechanism comprising a base, a first shaft rotatably mounted on said base, a plurality of drums mounted on said first shaft for rotation therewith, a strap connected to each of said drums and adapted to be wound thereon, means for normally yieldingly urging each of said drums in a rotating direction for winding said strap on each of said drums, a second shaft of a larger diameter than said first shaft mounted on said base for reciprocal movement only and axially aligned with said first shaft for movement over said first shaft, interlocking means comprising a first portion mounted on said second shaft for movement therewith and a second portion mounted on at least one of said drums for rotation therewith, said first portion upon actuation of said second shaft toward said first shaft engaging said second portion to simultaneously prevent rotation of each of said drums thereby locking said strap of each of said drums in its given position, and means for biasing said second shaft away from said first shaft for disengaging said first portion from said second portion to simultaneously release each of said drums for rotation thereof.

2. A safety device for preventing passengers in a vehicle from being thrown from their seats by inertia forces comprising in combination a supporting member adapted to be mounted on a vehicle, a shaft rotatably mounted on said supporting member, a plurality of drums fixedly mounted on said shaft for rotation therewith, a strap connected to each of said drums and adapted to be wound thereon, means for urging said drums and said shaft in a rotating direction for winding each strap on its respective drum, interlocking means comprising a first portion mounted on said supporting member for reciprocal movement only and a second portion mounted on said shaft for rotation therewith, said first portion adapted upon actuation thereof in one direction to engage said second portion to prevent rotation of said drums thereby locking said straps in given positions, and means for actuating said first portion in an opposite direction for disengaging with said second portion to release said drums for rotation thereof.

3. A safety device for preventing passengers in a vehicle from being thrown from their seats by inertia forces comprising in combination a supporting member adapted to be mounted on a vehicle, a shaft rotatably mounted on said supporting member, a pair of drums fixedly mounted on said shaft for rotation therewith, a strap connected to each of said drums and adapted to be wound thereon, means for normally yieldingly urging said drums and said shaft in a rotating direction for winding each strap on its respective drum, each strap passing across a part of the body of a passenger to meet in an engaging manner, interlocking means comprising a first portion mounted on said supporting member for reciprocal movement only and a second portion mounted on said shaft for rotation therewith, said first portion adapted upon actuation thereof in one direction to engage said second portion to prevent rotation of said drums thereby simultaneously locking said straps in given positions, and means for biasing said first portion in an opposite direction for disengaging with said second portion to simultaneously release said drums for rotation thereof.

4. A safety belt mechanism comprising a base, a first shaft rotatably mounted on said base, a plurality of drums fixedly mounted on said first shaft for rotation therewith, a strap connected to each of said drums and adapted to be wound thereon, hydraulic means for normally yieldingly urging said drums in a rotating direction for winding said strap on each of said drums, a second shaft mounted on said base for reciprocal movement only axially therealong, means for actuating said second shaft in one direction, interlocking means comprising a first portion mounted on said second shaft for movement therewith and a second portion mounted on said first shaft for rotation therewith, said first portion upon actuation of said second shaft in said one direction engaging said second portion to simultaneously prevent rotation of all of said drums thereby locking said strap of each of said drums in its given position, and means for biasing said second shaft in a second direction for disengaging said first portion from said second portion to release said drums for rotation thereof.

5. A safety belt mechanism comprising a base, a first shaft rotatably mounted on said base, a plurality of drums fixedly mounted on said first shaft, a strap connected to each of said drums and adapted to be wound thereon, electric motor means for simultaneously yieldingly urging each of said drums in a rotating direction for winding said strap thereon whenever said motor is energized and said strap of each of said drums is extended, a second shaft mounted on said base for reciprocal movement only axially therealong, means for actuating said second shaft in one direction, interlocking means comprising a first portion mounted on said second shaft for movement therewith and a second portion mounted on said first shaft for rotation therewith, said first portion upon actuation of said second shaft in said one direction engaging said second portion to simultaneously prevent rotation of each of said drums thereby locking said strap of each of said drums in its given position, and means for biasing said second shaft in a second direction for simultaneously disengaging said first portion from said second portion to release said drums for rotation thereof.

6. A safety belt mechanism comprising a base, a shaft rotatably mounted on said base, a plurality of drums fixedly mounted on said shaft for rotation therewith, a strap connected to each of said drums and adapted to be wound thereon, means for normally yieldingly urging said drums in a rotating direction for winding said strap of each of said drums thereon, interlocking means comprising a first portion mounted on said base for reciprocal movement only and a second portion fixedly mounted on said shaft for rotation therewith, said first portion adapted upon actuation thereof in one direction to engage said second portion to prevent rotation of said drums thereby locking said strap of each of said drums in its given position, and manual means for actuating said first portion in one direction to engage said second portion to simultaneously prevent rotation of each of said drums and in an opposite direction for disengaging with said second portion to simultaneously release each of said drums for rotation thereof.

7. A safety device for preventing passengers in a vehicle from being thrown from their seats by inertia forces comprising in combination a supporting member adapted to be mounted on a vehicle, a shaft rotatably mounted on said supporting member, a plurality of drums fixedly mounted on said rotatably mounted shaft, a strap connected to each of said drums and adapted to be wound thereon, means for urging said drums and said shaft in a rotating direction for winding said strap on each of said drums, interlocking means comprising a first portion mounted on said supporting member for reciprocal movement only and arranged adjacent a door of the vehicle for engagement by the door upon closure thereof and a second portion mounted on said shaft for rotation therewith, said first portion upon closure of a door of the vehicle being actuated in one direction to engage said second portion to simultaneously prevent rotation of all of said drums thereby simultaneously locking said strap of each of said drums in a given position, and means for actuating said first portion in an opposite direction upon opening of the door of the vehicle for disengaging with said second portion to simultaneously release all of said drums for rotation thereof.

References Cited in the file of this patent

UNITED STATES PATENTS

| 2,488,858 | Franz | Nov. 22, 1949 |
| 2,557,313 | Quilter | June 19, 1951 |
| 2,706,603 | Miller | Apr. 19, 1955 |
| 2,825,581 | Knight | Mar. 4, 1958 |